United States Patent [19]
Snyder

[11] Patent Number: 5,441,328
[45] Date of Patent: Aug. 15, 1995

[54] ADJUSTABLE SEAT BACK FOR A STROLLER

[75] Inventor: Timothy J. Snyder, West Seneca, N.Y.

[73] Assignee: Fisher-Price, Inc., East Aurora, N.Y.

[21] Appl. No.: 194,442

[22] Filed: Feb. 10, 1994

[51] Int. Cl.⁶ ............................................. A47C 3/00
[52] U.S. Cl. .............................. 297/284.9; 297/452.34
[58] Field of Search ............ 297/284.9, 452.34, 452.36

[56] References Cited

U.S. PATENT DOCUMENTS

| | | | |
|---|---|---|---|
| 2,619,157 | 11/1952 | Guyton et al. | 155/189 |
| 3,608,960 | 9/1971 | Sherman | 297/284 |
| 4,500,136 | 2/1985 | Murphy et al. | 297/284.9 |
| 4,603,902 | 8/1986 | Maloney | 297/35 |
| 4,653,805 | 3/1987 | Maloney | 297/284 |
| 4,696,514 | 9/1987 | Maloney | 297/284 |
| 4,793,652 | 12/1988 | Hannah et al. | 297/284.9 |
| 4,913,491 | 4/1990 | Mizuno et al. | 297/284 |
| 5,022,709 | 6/1991 | Marchino | 297/452 |

Primary Examiner—Peter R. Brown
Assistant Examiner—Anthony Barfield
Attorney, Agent, or Firm—Howrey & Simon; C. Scott Talbot; Melvin L. Barnes, Jr.

[57] ABSTRACT

An adjustable seat back has side sections that fold inward to provide lateral support for an infant or remain flat to provide a wider seat back for a toddler. A wing adjustment assembly sewn into a section of the seat liner includes a pivoting actuator. By actuation of the lever section of the actuator that extends through an aperture in the liner at the rear of the stroller, the operator can pivot a pair of wing support sections outward on the front side of the liner. The seat back portion of the seat pad consists of a center portion and two side wing sections that are pivotal with respect to the center section about substantially vertical axes along two seams. The wing support sections of the actuator act to push the two wing sections of the seat pad forward providing a narrower seat to provide lateral support for an infant.

9 Claims, 8 Drawing Sheets

ADJUSTABLE SEAT BACK FOR A STROLLER

BACKGROUND OF THE INVENTION

The invention relates generally to an adjustable seat back for a stroller, and more specifically to an adjustable seat back with side sections that fold inwardly to provide lateral support for a younger child or remain flat to provide a wider seat back for an older child.

A conventional stroller configuration (which is shown generally in FIG. 1) includes a seat having a back portion and a base portion, a push handle, and a pair of front and rear leg members. The front and rear legs are joined at a pivot point at one end and are fitted with wheels at the opposite end. The back portion of the seat and push handle are attached to the rear legs by a latch midway between the pivot point and the wheels.

The base and back portions of the seat usually consist of unisectional, nonadjustable cushions. The unisectional cushions are usually made generally planar and wide enough to accommodate a toddler. The width and planar aspects of these unisectional cushions can present a problem with the use of strollers by younger infants. By making the cushion wide enough to accommodate the larger child (a toddler), the cushions are often much wider than the children who are first beginning to use the stroller (a young baby or infant). Furthermore, infants often are not developed or coordinated sufficiently to sit up straight in the seat. Since the unisectional cushion provides no lateral support, the infant often tilts laterally, slumping sideways in the seat.

The foregoing problem could be alleviated by using a one-piece cushion which is contoured to fit the back of the youngest stroller user. However, this design would not be desirable since children tend to grow quickly, a stroller having a cushion which is contoured to fit an infant would soon become uncomfortable as the child grows. Thus, the effective length of use of a stroller having a contoured one-piece back would be unacceptably short. Consequently, it is desirable to provide a seat back that is adjustable between a narrow seat back for use by infants and a wide seat back for use by toddlers.

Several seat backs have been proposed that provide a method for narrowing the width of the seat back. U.S. Pat. No. 2,619,157 to Guyton et al. discloses an adjustable seat back for use by a pilot in an airplane. By rotating an adjusting knob that turns a threaded bar in a pair of threaded sleeves attached to the side panels, the side panels are moved laterally. Therefore, the pilot may incrementally adjust the width of the seat back by rotating the adjusting knob in the appropriate direction. Further, the side panels are attached to a split center section by a piano hinge and urged away from the occupant by a bungee cord so that when a release cable is pulled, the side panels open outward to release the pilot. However, the use of threaded bars, sprockets, and rotary knobs makes this a very complex design.

The adjustable automobile seat back disclosed in U.S. Pat. No. 4,913,491 to Mizuno et al., uses a pair of side supports, each of which are pivotable about a shaft and connected to each other by a transmission bar. By adjusting the transmission bar left or right, the user can simultaneously pivot both side supports inward or outward. Again, incorporation of the transmission bar and pivot shafts tends to make this a somewhat complex design.

Another adjustable seat back is disclosed in U.S. Pat. No. 3,608,960 to Sherman. This design includes two separately operated side supports that have a spring-urged ratchet mechanism so that when the occupant adjusts the side support, the ratchet mechanism retains the support in its adjusted position. The occupant must then push a release lever, disengaging the ratchet mechanism, to allow the side support to return to the plane of the central back section. Each of these side supports are individually operated so that the occupant must adjust and release each side support separately.

U.S. Pat. No. 5,022,709 to Marchino discloses an adjustable seat back that includes a flexible blade consisting of a convex central back portion and a pair of substantially flat side walls. When a load is applied to the flexible blade by the weight of the occupant, the central portion of the blade flexes so as to flatten the central portion and causes the ends of the central portion to move outward. Consequently, this causes the side walls to pivot about their respective hinges to produce a wrap-around effect. This design produces the opposite of the desired effect—the seat back remains wide under no (or light) load (e.g. an infant) and creates a wrap-around effect under a heavy load (e.g. a toddler).

Another adjustable seat back design is disclosed in U.S. Pat. Nos. 4,603,902; 4,653,805; and 4,696,514 all to Maloney. This design includes a stationary central back section and a pair of hinged side support sections. A latch member attached to each side support has a slot that engages a horizontal elongated bar when the side sections are coplanar with the central back portion. By pivoting the latch member 90 degrees to a horizontal orientation and manually pulling the side section away from the elongated bar, the corner portion of the latch member engages a slot in the elongated bar to hold the side section in the extended position. Thus, this design requires that each side support be adjusted separately.

SUMMARY OF THE INVENTION

The drawbacks of the prior art are overcome by the adjustable seat back of the present invention which includes at least three support sections, two of which are adjustable with respect to the third support section between a first position to provide lateral support for younger children and a second position to provide a sufficiently wide, comfortable seat back for older children. The seat back is adjusted by operating a single lever that simultaneously adjusts both side sections of the back support via an actuator hinged to a support member that pivots against the back of the side supports of the seat back to thrust them forward. This adjustable seat back design can be used in both traditional seats, such as high chairs, and other seats that typically contain ample padding and cushions, such as strollers.

DETAILED DESCRIPTION

The adjustable seat back of the present invention is described and illustrated below in the context of a child's stroller, although the adjustable seat back may be used on any similar seat in which a multi-width seat back is desirable such as a high chair, a portable swing, or a car seat.

Figure 1:
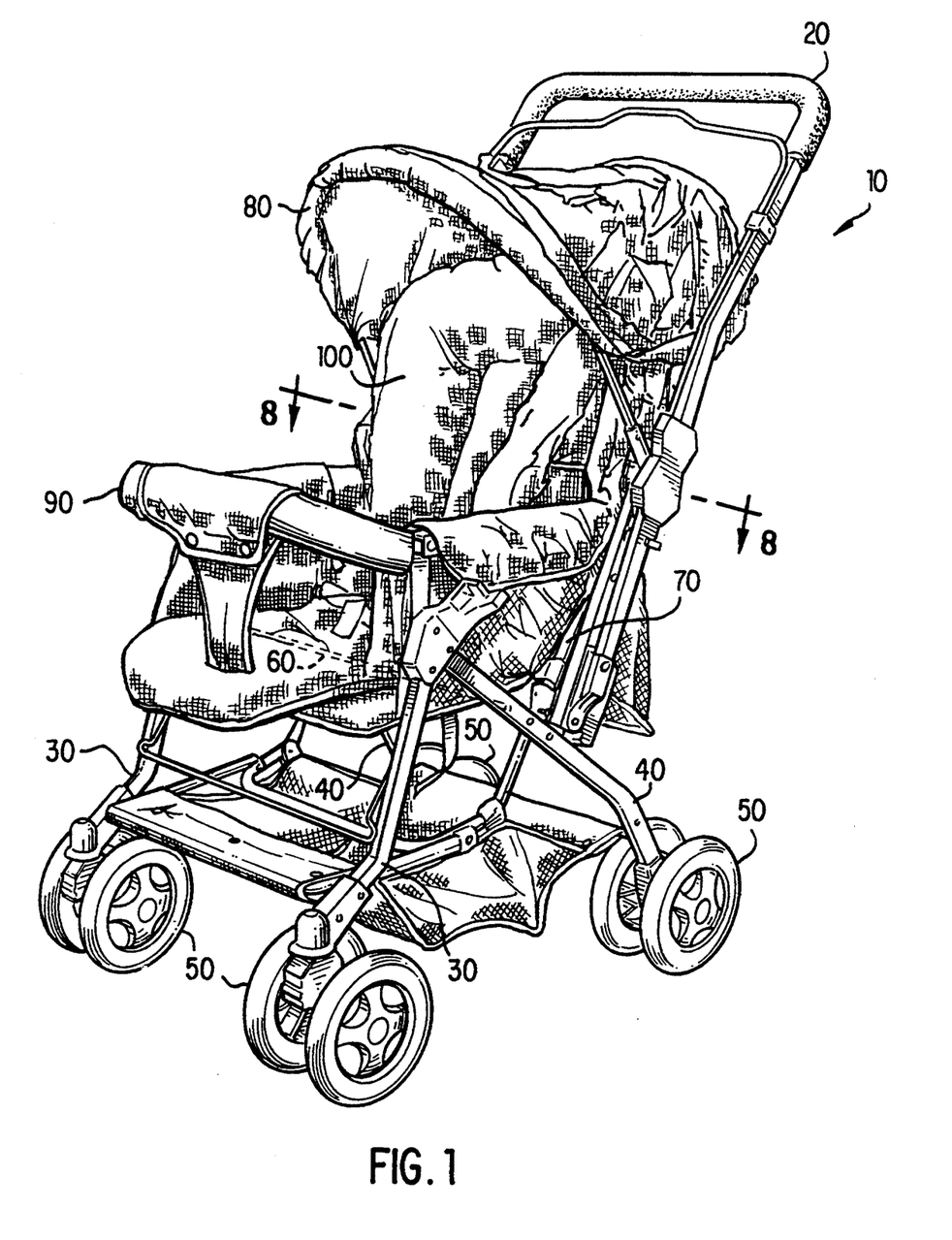
FIG. 1 is a perspective view of a stroller incorporating an adjustable seat back employing the principles of the present invention.

A stroller 10 is illustrated in FIG. 1. The stroller 10 has a push handle 20, a seat base support member 60, a seat back support member 70, a canopy 80, a grab bar 90, arm rests 95, a pair of front legs 30, and a pair of rear legs 40 with a pair of wheels 50 disposed at the end of each leg.

Figure 2:
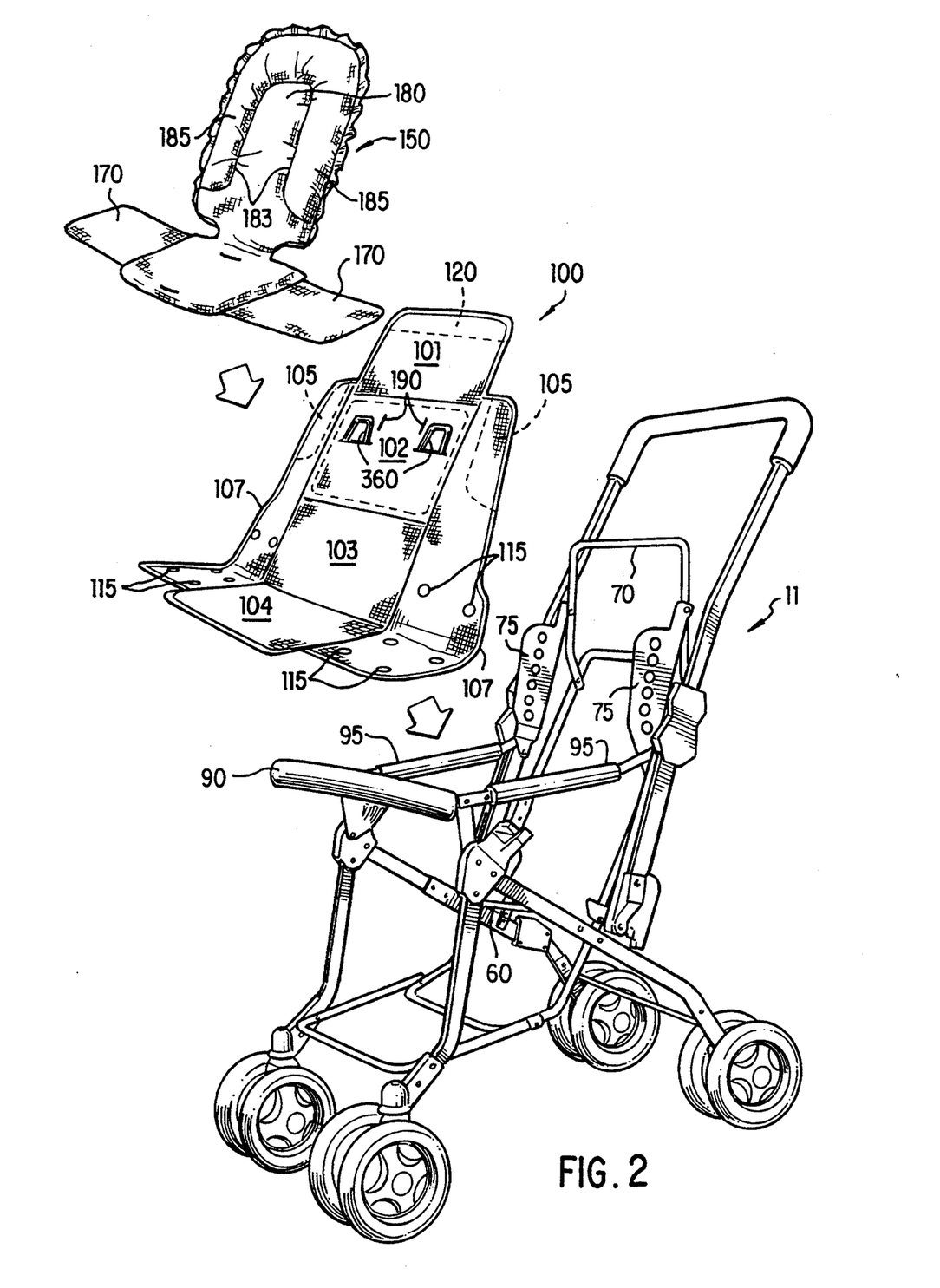
FIG. 2 is an exploded perspective view of the stroller frame, seat liner, and seat pad of the stroller in FIG. 1.

The frame 11 of the stroller 10 is shown in FIG. 2 along with a seat liner 100 and seat pad 150. The central body of the seat liner 100 is divided into four sections 101–104, each of which encloses a rigid panel (not shown, but in this embodiment is an injected molded plastic panel and could be made of hardboard) that provides rigidity to each section 101–104 of the seat liner 100 and support for the occupant. The seat liner 100 is placed on the stroller frame 11 so that seat liner pocket 120 is positioned over the top of seat back support 70 to secure the back of the seat liner in place. The liner 100 also includes a pair of upper side pockets 105 that are fitted over seat back side supports 75 to hold the seat liner 100 stationary with respect to the stroller frame 11. In addition, lower side sections 107 are folded over arm rests 95 and fastened by snaps 115 to further secure the liner 100.

Figure 7:
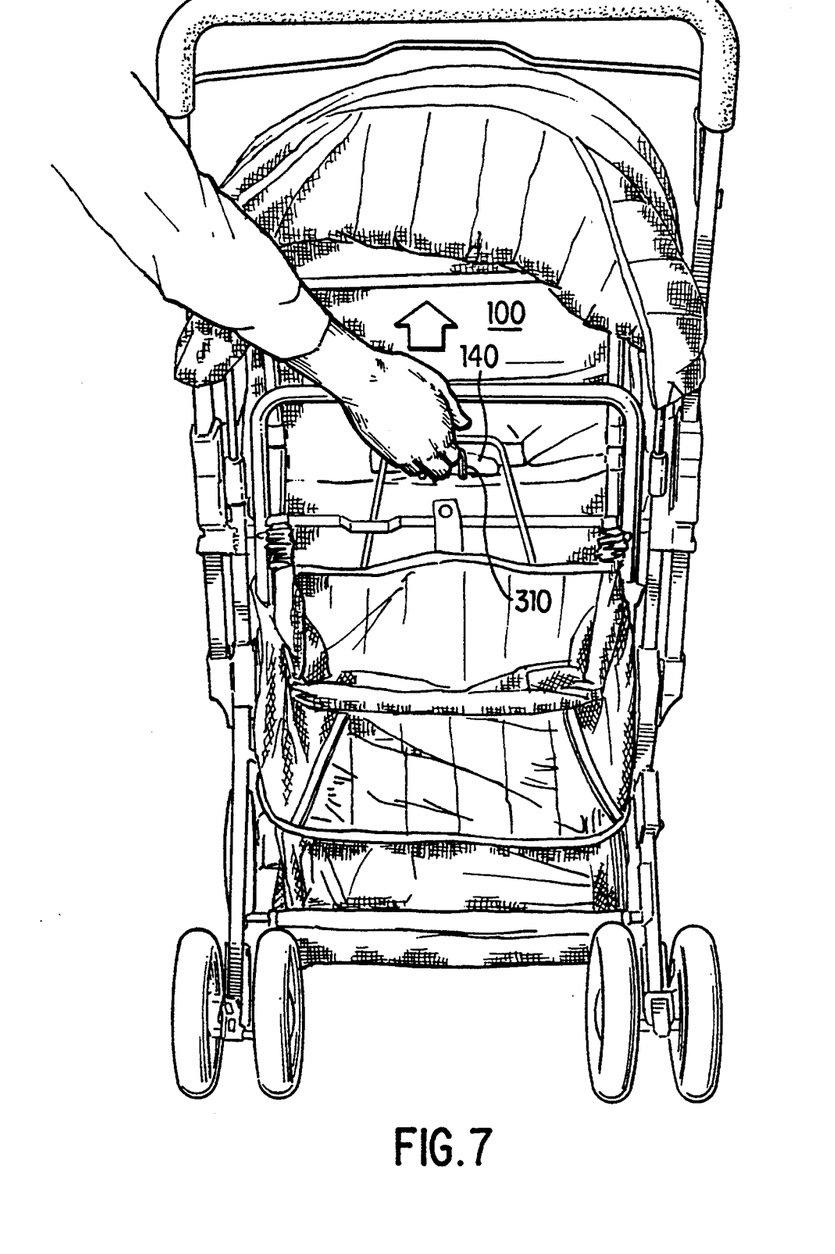
FIG. 7 is a perspective view of the rear of the stroller in FIG. 1.

Seat pad 150, which acts as a removable and washable cushion for the child, is placed over installed seat liner 100. Arm pads 170 wrap over the top of lower side sections 107 and are secured in place by a strip hook-and-loop fastener material (not shown). A pair of fastening ties 140 are sewn into the back of seat pad 150. These ties are fastened to the liner side of center back section 180 and extend through seat liner apertures 130 to be secured to each other by a strip of hook-and-loop fastener material, as shown in FIG. 7. These ties 140 hold the center back section 180 of the seat pad 150 stationary with respect to seat liner 100. Wing sections 185 extend laterally from center back section 180 and are pivotable about substantially vertical axes at seams 183. Furthermore, inside each wing section 185 (see FIG. 8) is a rigid base panel 185A (such as hardboard or plastic) on the liner side of the wing section to provide support against wing support sections 360. Padding inside the wing sections 185 on the occupant side, between the rigid panel and occupant, allows for a comfortable seat back. The center back section 180 also has a rigid base panel 180A (such as hardboard or plastic) to provide support to the occupant.

Figure 3:
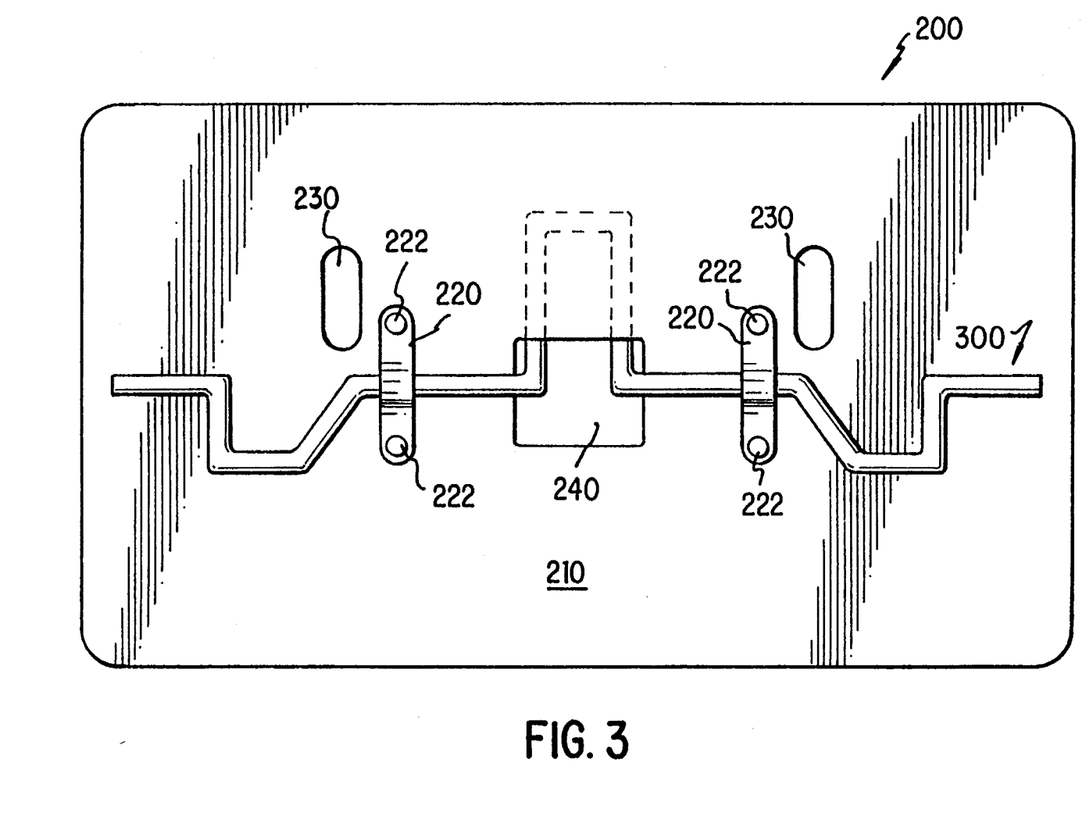
FIG. 3 is a front view of the wing adjustment assembly of the stroller in FIG. 1 with the wing adjustment assembly in the extended position.
Figure 4:
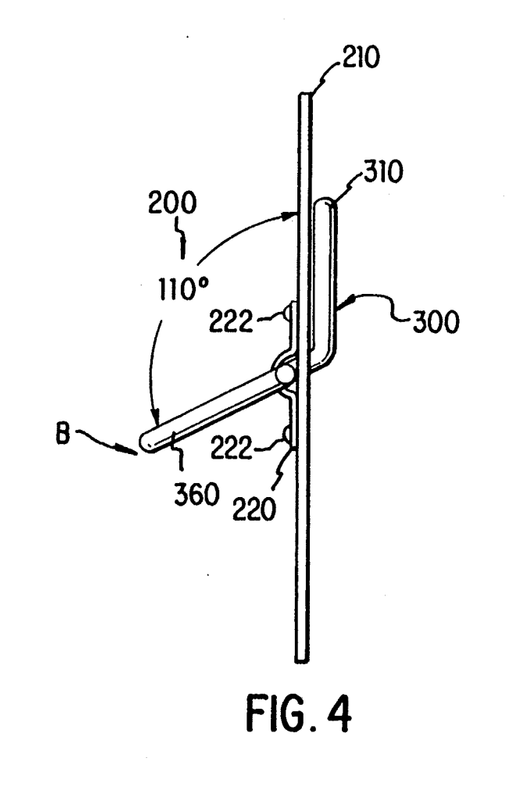
FIG. 4 is a side view of the wing adjustment assembly in the extended position.
Figure 5:
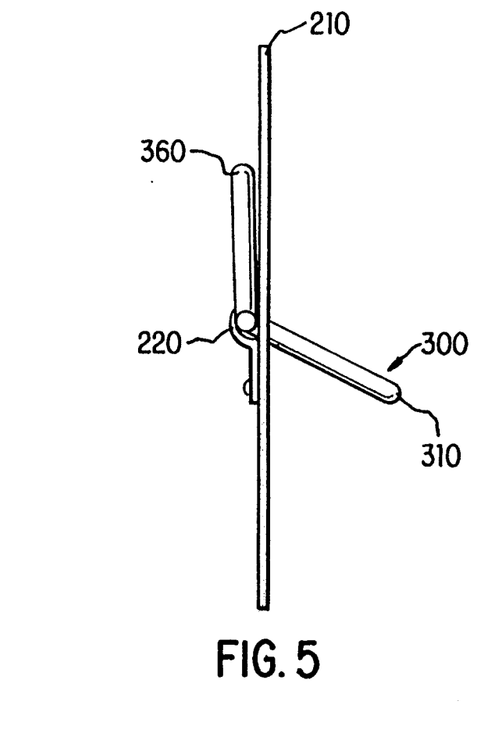
FIG. 5 is a side view of the wing adjustment assembly in the retracted position.

Seat liner section 102 further includes a wing adjustment assembly 200, illustrated in FIGS. 3, 4 and 5. The wing assembly 200 consists of an actuator 300, which in the illustrated embodiment is a wireform made of bent, heavy-gauge, powder-coated steel wire, that is attached to base panel 210 by clips 220. The actuator 300 in this embodiment is also painted red for easy identification by the operator.

Figure 6:
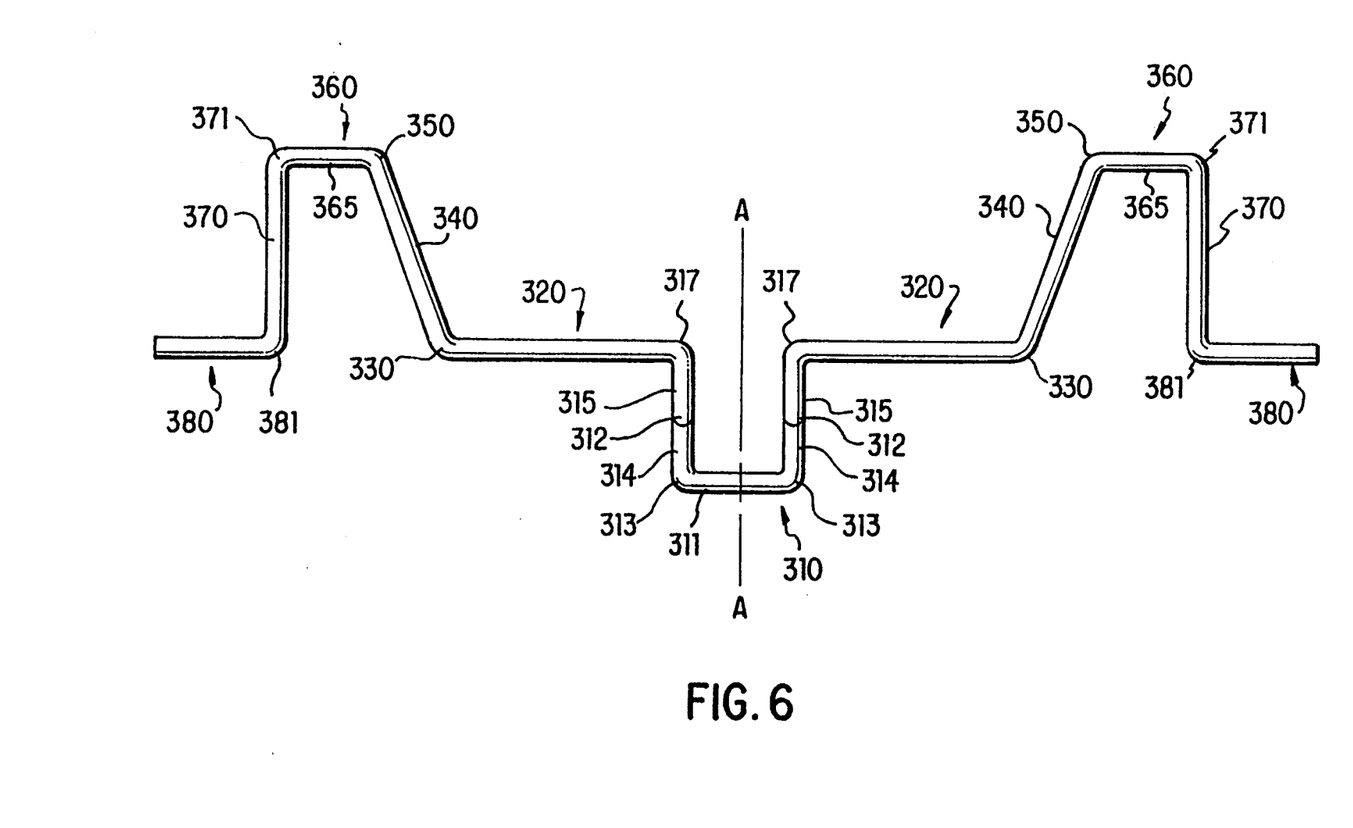
FIG. 6 is a front view of the actuator of the wing adjustment assembly of FIG. 3.

As shown in FIG. 6, actuator 300 is symmetric about center line A. The following description of one side of the actuator applies equally to both sides. Each side of actuator 300 can be divided into four sections: end section 380; wing support section 360; pivot section 320; and half of lever 310. End section 380 which is joined to wing support section 360 at corner 381. Wing support section 360 consists of outside segment 370 which is joined to end support segment 365 at corner 371. End support segment 365 is joined to inside support segment 340 at corner 350.

Wing support section 360 is joined to pivot section 320 at corner 330. Pivot section 320 is joined to lever 310 at corner 317. Lever 310 consists of a pair of first side segments 315 connected to a pair of second side segments 314 at bends 312. Second side segments 314 are joined to lever end segment 311 at corners 313. Actuator 300 is mounted on the front side (facing the seat pad) of base panel 210, with lever 310 projecting rearwardly through lever aperture 240 of base panel 210, and is fixed in place by clips 220. The clips 220 in this embodiment are fastened to base panel 210 by rivets 222 at both ends, but any appropriate fastening method could be used. Clips 220 are fastened tightly enough that friction between the clips 220 and the actuator 300 will prevent undesired and unassisted pivoting of the actuator 300, but also allow for easy actuation by the operator.

Actuator 300 is pivotable between a first extended position (as shown in FIG. 4) in which wing support sections 360 project out from the base panel 210 and lever 310 is substantially vertical and adjacent base panel 210 to a second, retracted position (as shown in FIG. 5) in which wing support sections 360 are substantially vertical and adjacent base panel 210 and lever 310 projects away from base panel 210.

Lever 310 extends rearwardly through a slot in seat liner 100 for access at the rear of the stroller by the operator as shown in FIG. 7. Wing support sections 360 extend through slots on the front side of seat liner 100 as shown in FIG. 2 to engage the liner side of wing sections 185 of seat pad 150.

Figure 9:
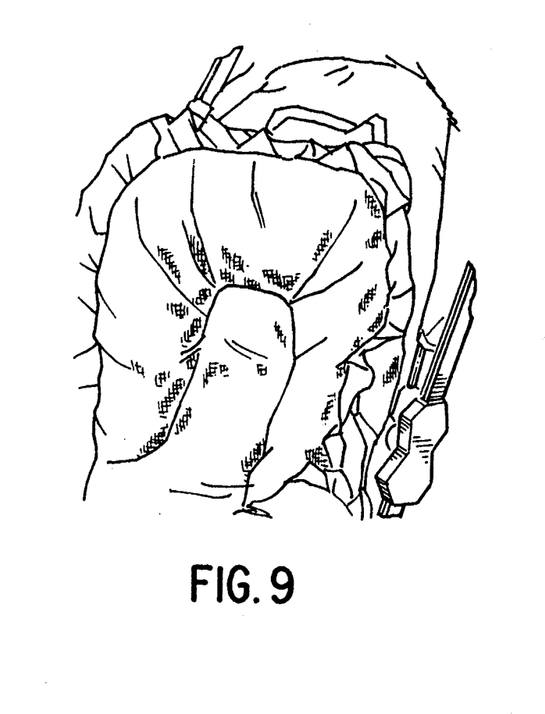
FIG. 9 is a partial front perspective view of the stroller in FIG. 1 with the stroller seat back in the wide configuration.

When the actuator 300 is in the retracted position as shown in FIG. 5, the wing sections 185 rest substantially coplanar with center back section 180. This configuration provides for a wider seat back to be used for older children as shown in FIG. 9.

Figure 8:
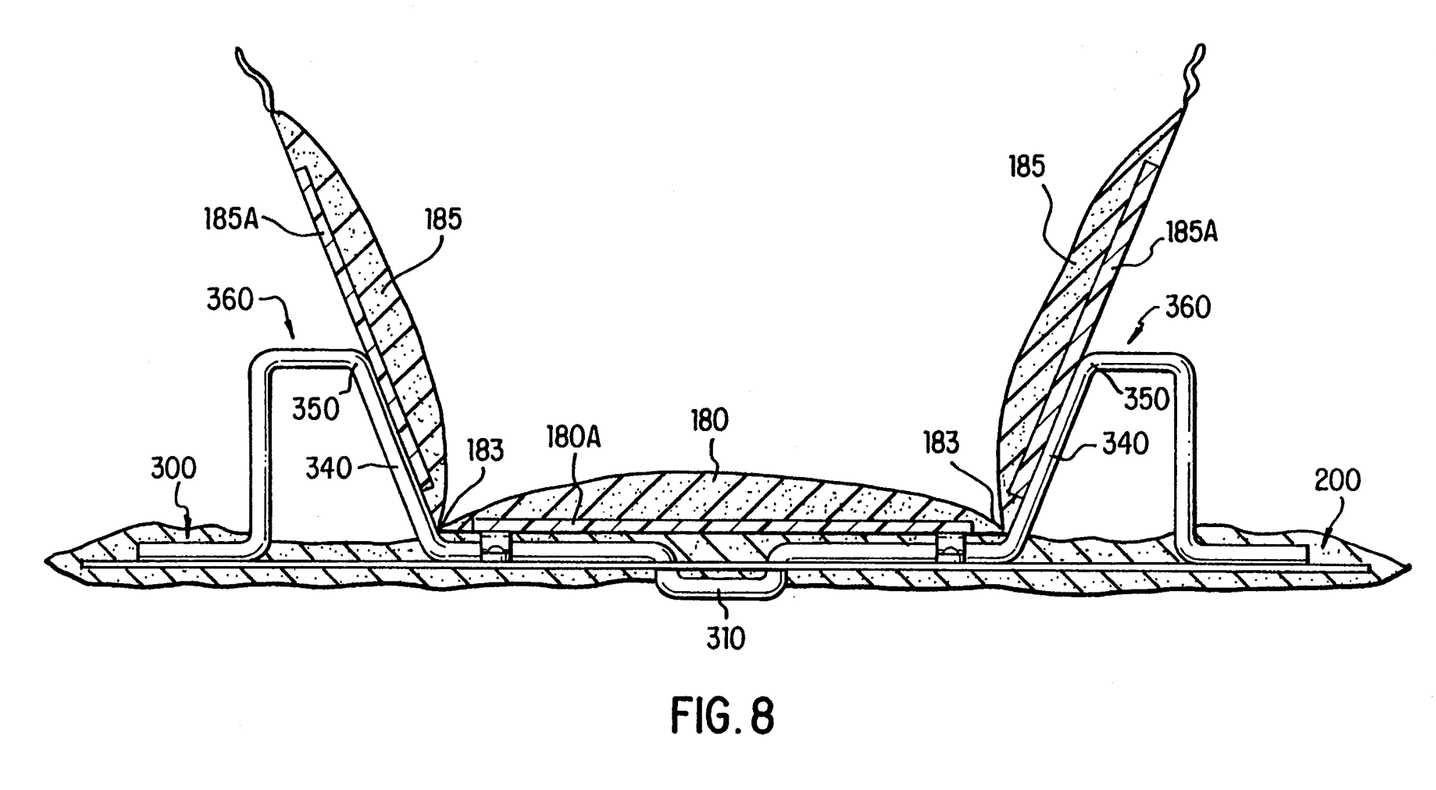
FIG. 8 is a cross-sectional view of the stroller seat back of the stroller in FIG. 1 taken along line I—I with the wing adjustment assembly in the extended position.
Figure 10:
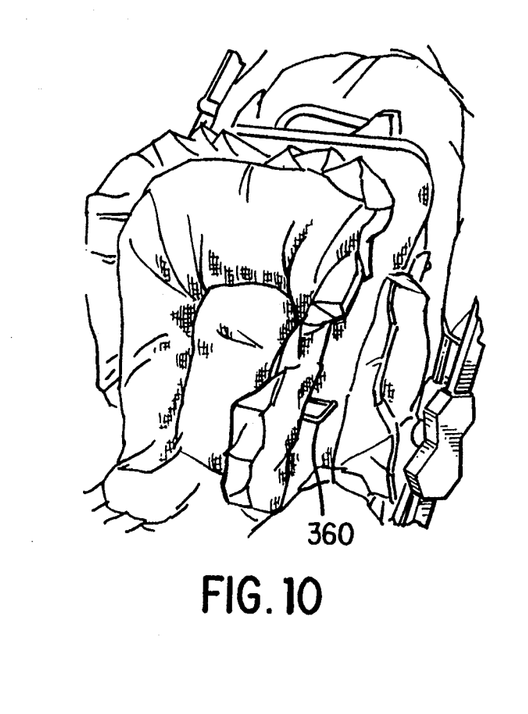
FIG. 10 is a partial front perspective view of the stroller in FIG. 1 with the stroller seat back in the narrow configuration.

When the actuator 300 is in the extended position as shown in FIGS. 4 and 8, the liner side of side wing sections 185 is supported by inside side segments 340 of wing support sections 360 of actuator 300. In this configuration, the wing support sections 360 are prevented from pivoting further downwardly by the engagement of lever 310 with the back of base panel 210. In this embodiment, the wing support extensions are pivoted downward approximately 110° from the base panel 210 in the extended position. Since this angle is greater than 90°, a lateral force on wing support section 360, as indicated by arrow B, will tend to keep actuator 300 in the extended position (rather than urging the wing support section 360 up into the retracted position). This configuration provides for a narrower seat back for use by younger children or infants as shown in FIG. 10.

To transition the adjustable seat back from the wide to the narrow configuration, the operator need only pivot lever 310 upwardly as shown in FIG. 7 from its extended position (as shown in FIG. 5) to its vertical position parallel to base panel 210 (as shown in FIG. 4). At the initial moment of actuation of lever 310, end support segments 365 contact the liner side of wing sections 185 urging them to pivot about hinge 183. As wing sections 185 pivot away from base panel 210, inside support segments 340 become flush with the liner sides of wing sections 185 urging them outward in pivotal directions about vertical axes through hinges 183 until the actuator 300 stops in its extended position.

To transition the adjustable seat back from the narrow to the wide configuration, the operator need only pivot lever 310 from its vertical position adjacent base panel 210 to its extended position. This in turn will pivot wing support sections 360 to the retracted position substantially vertical and adjacent base panel 210. Thus, wing sections 185 will no longer be supported by wing support sections 360. When a force is applied (such as by a child sitting in the seat) to wing sections 185 urging them toward the liner 100, wing sections 185 will pivot towards the liner 100 to become coplanar with center back section 180. However, wing sections 185 are not retracted to the wide configuration by the actuation of the actuator 300, but return there as a result of some other force which could be the weight of a child, manually pushing the side sections rearward, or by the urging of hinges 183 toward the coplanar state.

Although the previously described embodiment discloses two movable side sections, this invention could also be used with one movable side section and one fixed side section. Further, the actuator 300 could be a molded piece of plastic incorporating projecting wing support sections and an operating lever and mounted for pivotal movement.

Whereas the previously described embodiment discloses an operating lever located in the center, the invention could instead employ a lever at one or both sides. Still another embodiment might use a sliding actuator that moves linearly with respect to the plane of the base panel with the wing support sections in the extended position and only engaging the side sections when in an engaging position.

What is claimed is:

1. An seat back adjustable by an operator to accommodate an occupant, comprising:
    a seat pad having
        a center back section and
        a side wing section, each of said center back section and said side wing section having a front face to support the occupant and an opposite, rear face, said side wing section being coupled to said back section for pivotal movement between a first, wide position in which said wing section is substantially coplanar with said back section, and a second, narrow position in which said front face of said wing section is rotated toward said front face of said back section; and
    a wing actuator assembly having:
        a substantially planar base panel with a front face, a rear face, and an actuator aperture therethrough, and
        a wing actuator mounted on said base panel, said base panel being disposed with said front face of said base panel adjacent to said rear face of said back section,
    said wing actuator having a longitudinal axis, and including a lever section and a wing support section, said wing actuator being mounted on said base panel with said longitudinal axis being substantially parallel to said base panel, said wing support section being disposed between said base panel and said wing section, and said lever section extending through said actuator aperture for providing accessibility to an operator from said rear face of said base panel, said wing actuator being mounted on said base panel for pivotal movement about said longitudinal axis between a first, extended position in which said wing support section extends from said front side of said base panel to engage said rear face of said wing section and urge said wing section into said narrow position, and a second, retracted position in which said wing support section is disposed substantially parallel to said front face of said base panel.

2. The seat back of claim 1, wherein:
    said seat pad has a second side wing section having a front face to support the occupant and an opposite, rear face, said second side wing section being coupled to said back section opposite said side wing section, for pivotal movement between a first, wide position in which said second side wing section is substantially coplanar with said back section, and a second, narrow position in which said front face of said second side wing section is rotated toward said front face of said back section; and
    said wing actuator has a second wing support section disposed between said base panel and said second side wing section, said second wing support section extending from said front side of said base panel to engage said rear face of said second side wing section and urge said second side wing section into said narrow position when said wing actuator is in said extended position, and said second wing support section is disposed substantially parallel to said front face of said base panel when said wing actuator is in said retracted position.

3. The seat back of claim 2 wherein:
    said side wing section and said second side wing section are symmetrically arranged about said back section; and
    said wing support section and said second wing support section are symmetrically disposed about said lever section.

4. The seat back of claim 3, wherein:
    said wing actuator includes a center line;
    said wing support section and said second wing support section each includes an end support section parallel to and displaced from said longitudinal axis in a first direction;
    a first and second inside support section, each having a first end disposed on said longitudinal axis and disposed a first distance from said center line, and a second end displaced from said longitudinal axis and disposed a second distance from said center line, said second ends of said first and second inside support sections coupled to said first and second end support sections;
    said second distance being greater than said first distance;

a first and second pivot section coupled to said first ends of said first and second inside support sections, said first and second pivot sections being disposed on said longitudinal axis;

a first and second side lever segment extending substantially perpendicular to said longitudinal axis, said first and second lever segments coupled to opposite ends of a lever end segment, said lever end segment being disposed parallel to and displaced from said longitudinal axis in a second direction;

said first direction being substantially opposite to said second direction with respect to said longitudinal axis; and said first and second inside support sections supporting said side wing section and second side wing section, respectively, in said narrow positions.

5. The seat back of claim 1, further comprising a mounting member pivotally coupling said side wing actuator to said base panel, said mounting member frictionally engaging said wing actuator with sufficient frictional force to inhibit unintended movement of said wing actuator between said extended position and said retracted position.

6. The seat back of claim 1 wherein said wing actuator is formed of wire rod.

7. The seat back of claim 1, further comprising:
a seat frame;
a seat liner disposed between said seat pad and said seat frame housing said base panel and said wing actuator, and having slots therethrough through which said wing support section and said lever section extend.

8. The seat back of claim 1 wherein said lever section is disposed substantially parallel to, and in engagement with, said base panel, when said wing actuator is in said extended position.

9. The seat back of claim 8 wherein said wing support section and said lever section are angularly spaced about said longitudinal axis more than 90 degrees so that when said wing actuator is disposed in said extended position, said wing support section is disposed at an angle of greater than 90 degrees to said base panel, lateral forces on said wing section thereby urging said wing actuator toward said extended position.

* * * * *